United States Patent [19]

Mowry, Jr. et al.

[11] Patent Number: 5,853,197
[45] Date of Patent: Dec. 29, 1998

[54] SECURITY DOCUMENT

[75] Inventors: William H Mowry, Jr.; A Dale Lakes, both of Dayton, Ohio

[73] Assignee: The Standard Register Company, Dayton, Ohio

[21] Appl. No.: 611,378

[22] Filed: Mar. 5, 1996

[51] Int. Cl.$^6$ ................................................ B42D 15/00
[52] U.S. Cl. ........................... 283/91; 283/72; 283/902; 359/569
[58] Field of Search ............................. 283/93, 902, 85, 283/91, 95, 86, 58; 359/566, 569, 576

[56] References Cited

U.S. PATENT DOCUMENTS

| | | |
|---|---|---|
| 4,227,720 | 10/1980 | Mowry, Jr., et al. . |
| 4,234,214 | 11/1980 | Lee .............................................. 283/93 |
| 4,579,370 | 4/1986 | Corwin et al. . |
| 4,715,623 | 12/1987 | Roule et al. ................................ 283/91 |
| 4,891,666 | 1/1990 | Gordon et al. . |
| 5,074,596 | 12/1991 | Castagnoli ................................ 283/902 |
| 5,078,428 | 1/1992 | Maeno ........................................ 283/93 |
| 5,197,765 | 3/1993 | Mowry, Jr., et al. ....................... 283/93 |
| 5,297,815 | 3/1994 | Anderson et al. ......................... 283/902 |
| 5,340,159 | 8/1994 | Mowry, Jr. .................................. 283/93 |
| 5,375,886 | 12/1994 | Tsuchiya . |
| 5,487,567 | 1/1996 | Volpe . |
| 5,538,290 | 7/1996 | Diamond .................................. 283/113 |
| 5,575,508 | 11/1996 | Diamond .................................... 283/93 |
| 5,707,083 | 1/1998 | Wallace . |
| 5,717,040 | 12/1992 | Orndoff ..................................... 283/85 |
| 5,735,547 | 1/1998 | Morelle et al. ............................ 283/67 |

FOREIGN PATENT DOCUMENTS

| | | |
|---|---|---|
| 0204552 | 12/1986 | European Pat. Off. . |
| 0546765 | 6/1993 | European Pat. Off. . |
| 6110482 | 1/1986 | Japan ...................................... 283/902 |
| 63-21970 | 2/1988 | Japan . |
| 2018197 | 3/1979 | United Kingdom . |

*Primary Examiner*—Willmon Fridie, Jr.
*Attorney, Agent, or Firm*—Killworth, Gottman, Hagen and Schaeff, L.L.P.

[57] ABSTRACT

A security document is provided comprising a substrate having a top surface for carrying indicia. The top surface has a plurality of areas. Each of the areas contains background printed matter on the top surface. The background printed matter made up of a pattern of background elements. Each of the areas also contains a security term printed on the top surface of the substrate. The security term is composed of a pattern of security term elements. The background elements and/or the security term elements differ in element size, shape, angle, density, and/or frequency between adjacent areas. Also, within each of the areas either the background elements or the security term elements are not readily duplicated by a color copier while the remaining elements in the area are readily duplicated by a color copier. This results in a visually perceptible security term being produced upon copying of the security document.

21 Claims, 2 Drawing Sheets

SECURITY DOCUMENT

BACKGROUND OF THE INVENTION

The invention is directed towards an improved security document and, more particularly, to a security document having a plurality of areas in which hidden warning messages are printed in differing combinations of lines, dots, and elements of various sizes and shapes.

Color photocopiers have been used for years to make accurate copies of commonly available documents. In many cases, there are legitimate reasons for making such copies. Unfortunately, color copies may also be made and used for illegal purposes. Specifically, there has been concern that color copiers could be used to reproduce security documents, such as checks, stock certificates, automobile title instruments, birth certificates, college transcripts, prescriptions, and other documents of value, for illegal purposes. This concern has been heightened with the advent of desk top publishing software and hardware, including personal computers and scanners. Such desk top publishing systems allow sophisticated image processing and printing not previously generally available.

Many techniques have been developed to prevent improper reproduction of security documents. One of the most successful is the use of a hidden warning message which is readily apparent on reproduced copies of a document, but which is invisible, or nearly so, on the original document.

Many techniques have been used to produce this effect. One technique is shown in U.S. Pat. No. 4,227,720. A single tone warning phrase and a single tone background pattern are used. Tone refers to the visual effect produced by solid ink coverage or by halftone dots, bars, or marks which cover a portion of a printed area and which usually have a frequency that is measured in dots, lines, or marks per inch. Halftone dots, bars, or marks printed with a dark ink may be more or less uniformly distributed over an area to produce the visual effect of a lighter overall color. Printing an image with less than full area coverage is said to be printing less than a full tone image. The warning phrase and background pattern area tones are of different frequency and are made up of dots, bars, or marks of differing size, but they are selected to provide similar appearance to the eye of a casual observer. A less than full tone effect may also be produced by full area coverage of a paler color of ink than the darker color of ink used for the halftone dots, bars, or marks.

Because the tone of the warning phrase and the tone of the background pattern are selected to be generally the same, these two areas have much the same visual impact on an observer of the original document, and the warning phrase is not readily perceived. The optics of color copiers have typically been unable to reproduce relatively small halftone dots, lines or other elements. As a consequence, reproduced copies of the original document will have a noticeable warning phrase.

A camouflage pattern is sometimes utilized to obscure the warning phrase further. The camouflage pattern may be defined by areas in which the dots, bars, or marks have been deleted from both the warning phrase and the background pattern. The camouflage pattern may also be defined by a pattern of dots, bars, or marks which are smaller than or larger than those used in the background pattern and the warning phrase, or by areas of complete coverage of a paler ink. The camouflage pattern may permit the tone of the warning phrase and the tone of the background pattern to differ somewhat, while confusing the eye of the casual observer so that the warning phrase is not readily apparent.

The 4,227,720 patent uses small dots as background elements while larger dots are used to form a warning word. Other patents have used different elements to achieve a similar effect. U.S. Pat. No. 4,891,666 uses small dots as background elements and line segments to form a warning word. U.S. Pat. No. 5,375,886, on the other hand, uses curved lines as background elements and small dots to form the warning word. Another technique is shown in UK Patent Application GB 2,018,197 A. In this published application, line segments are used both as background elements and as warning word elements. The lines are perpendicular to each other in the areas defining the background pattern and the warning phrase.

In recent years, color copiers have been improved substantially. These new color copiers have made the above techniques less effective in protecting documents. By manipulating the control settings on such copiers, copies can be made of such documents in which the warning phrase does not appear on reproductions when some of the most commonly used frequency and size combinations are used. For example, by adjusting the settings for sharpness and lightness/darkness it has still been possible on some copiers for a skilled individual to produce a copy in which the warning phrase is not visible. Furthermore, desk top publishing systems now available in conjunction with laser printers, offer additional possibilities for unauthorized copying.

Therefore, there remains a need in the art for a security document which provides improved protection against copying over a wide range of copier settings, or against manipulation using desk top publishing systems.

SUMMARY OF THE INVENTION

This need is met by the present invention whereby an improved security document is provided. The present invention divides the surface of a security document into numerous areas, referred to as copy modules, in which different security image techniques are used. This results in an improved security document because different techniques will be more effective under different conditions. Therefore, when one copy module security image is rendered ineffective due to the copier settings or the orientation of the document on the copier, other copy modules will still produce a security image upon copying.

In accordance with one aspect of the present invention, a security document is provided. The security document comprises a substrate having a top surface for carrying indicia. The top surface has a plurality of areas. Each of the areas contains background printed matter that is made up of a pattern of background elements. Each of the areas also contains a security term printed on the top surface of the substrate. The security term is composed of a pattern of security term elements. The background elements or the security term elements, or both, differ in element size, shape, angle, density, and/or frequency between adjacent areas. Also, within each of the areas either the background elements or the security term elements are not resolvable by a color copier while the remaining elements in the area are resolvable by a color copier. This results in a visually perceptible security term being produced on a photocopy of the security document.

Preferably, the background printed matter in an area is made up of a pattern of background elements of substantially the same size. Also, the security term is preferably made up of a pattern of security term elements of substantially the same size. In some areas, the background elements are not resolvable by the color copier while in other areas, the security term elements are not resolvable by a color copier.

Preferably, the security term is a cancellation term. Also, each security term element is preferably a printed dot or a line segment. Additionally, each background element is preferably a printed dot or a line segment.

In a preferred embodiment, each security term element and each background element is a printed dot. In an alternative preferred embodiment, each security term element and each background element is a line segment.

Preferably, elements shaped as line segments are oriented at angles of approximately 0, 15, 30, 45, 60, 75, 90, 105, 120, 135, 150, or 165 degrees to the horizontal axis of the security document. Also preferably, the background elements are spaced at twice the frequency of the security term elements.

In a preferred embodiment, the security document also contains a camouflage pattern on the top surface. The camouflage pattern may be defined by the absence of the background elements and/or the security term elements. The background elements and/or the security term elements are either completely or partially removed. Alternatively, the camouflage pattern is defined by the presence of further elements.

Preferably, the top surface of the security document contains at least three areas. More preferably, the top surface contains at least four areas. Still more preferably, the top surface contains at least ten areas. More preferably, the top surface contains at least twenty areas. Most preferably, the top surface contains at least forty areas.

In accordance with a second aspect of the present invention an improved security document is provided. The security document comprises a substrate having a top surface for carrying indicia and a plurality of areas on the top surface. Each of the areas contains background printed matter on the top surface. The background printed matter is made up of a pattern of background elements and the background elements are not resolvable by a color copier. Each of the areas also contains a security term printed on the top surface of the substrate. The security term is composed of a pattern of security term elements. The security term elements are resolvable by a color copier to show a visually perceptible security term. In addition, the background elements or the security term elements, or both, differ in element size, shape, angle, density, and/or frequency between adjacent areas.

In accordance with a third aspect of the present invention an improved security document is provided. The security document comprises a substrate having a top surface for carrying indicia and a plurality of areas on the top surface. Each of the areas contains background printed matter on the top surface. The background printed matter is made up of a pattern of background elements and the background elements are resolvable by a color copier to show a visually perceptible security term. Each of the areas also contains a security term printed on the top surface of the substrate. The security term is composed of a pattern of security term elements. The security term elements are not resolvable by a color copier. In addition, the background elements or the security term elements, or both, differ in element size, shape, angle, density, and/or frequency between adjacent areas.

Accordingly, it is an object of the present invention to provide an improved security document in which a variety of areas containing hidden security terms are present on the surface of the document; and to provide such a document with various combinations of background elements and security term elements in the different areas. Other objects and advantages of the invention will be apparent from the following description, the accompanying drawings and the appended claims.

DETAILED DESCRIPTION OF THE PREFERRED EMBODIMENTS

The present invention is an improvement over past security documents in that it provides a variety of security images on one document and these security images are produced using a variety of techniques. This results in an improved security document because different techniques will be more effective in different conditions. Therefore, when one copy module security image is rendered ineffective due to the copier settings or the orientation of the document on the copier, other copy modules will still produce a security image upon copying. Also, the present invention is useful in providing a security element on documents having limited available unprinted surface area, such as currency, tickets, and other small items.

Figure 1:
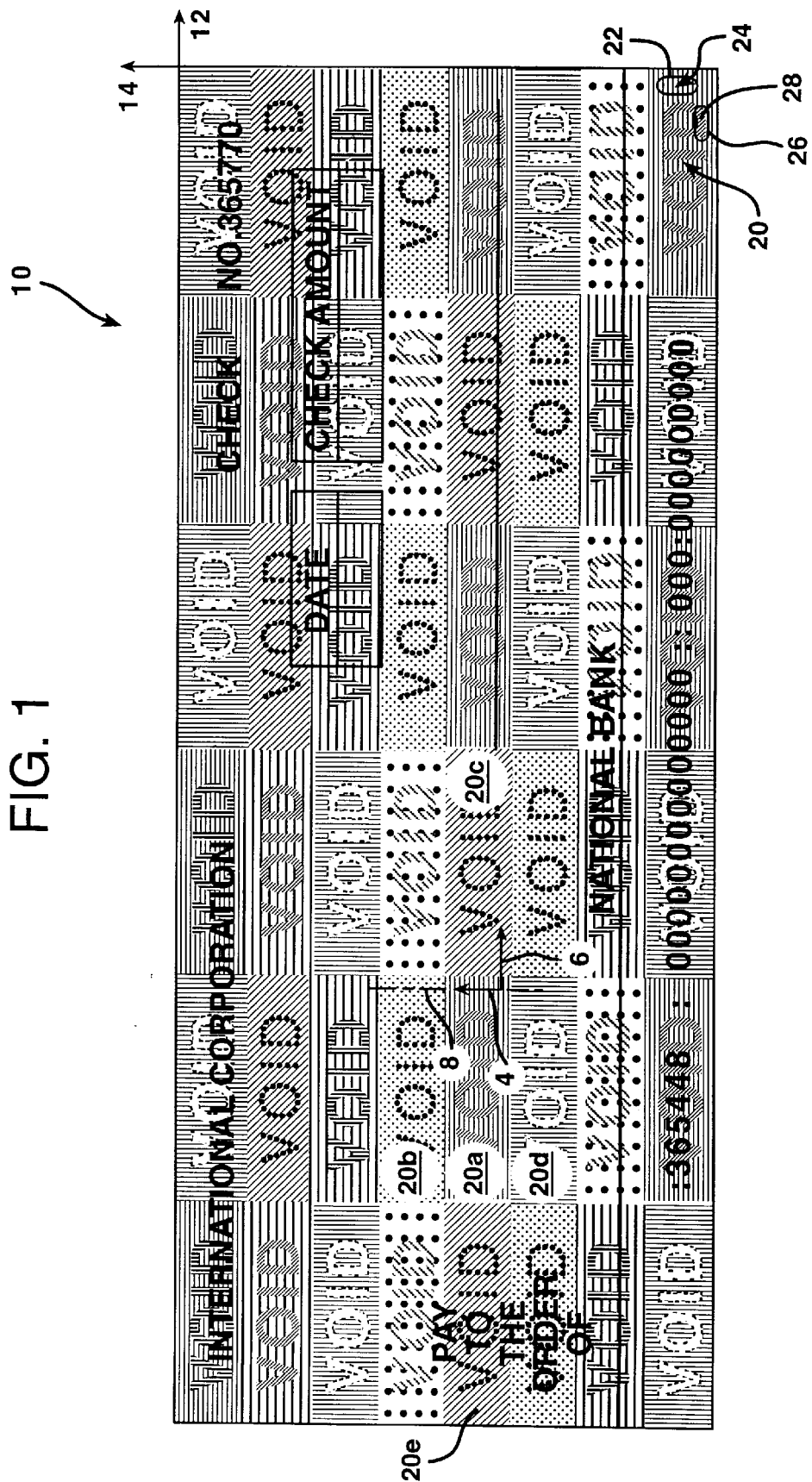
FIG. 1 is a schematic representation of a check according to the present invention.
Figure 2:
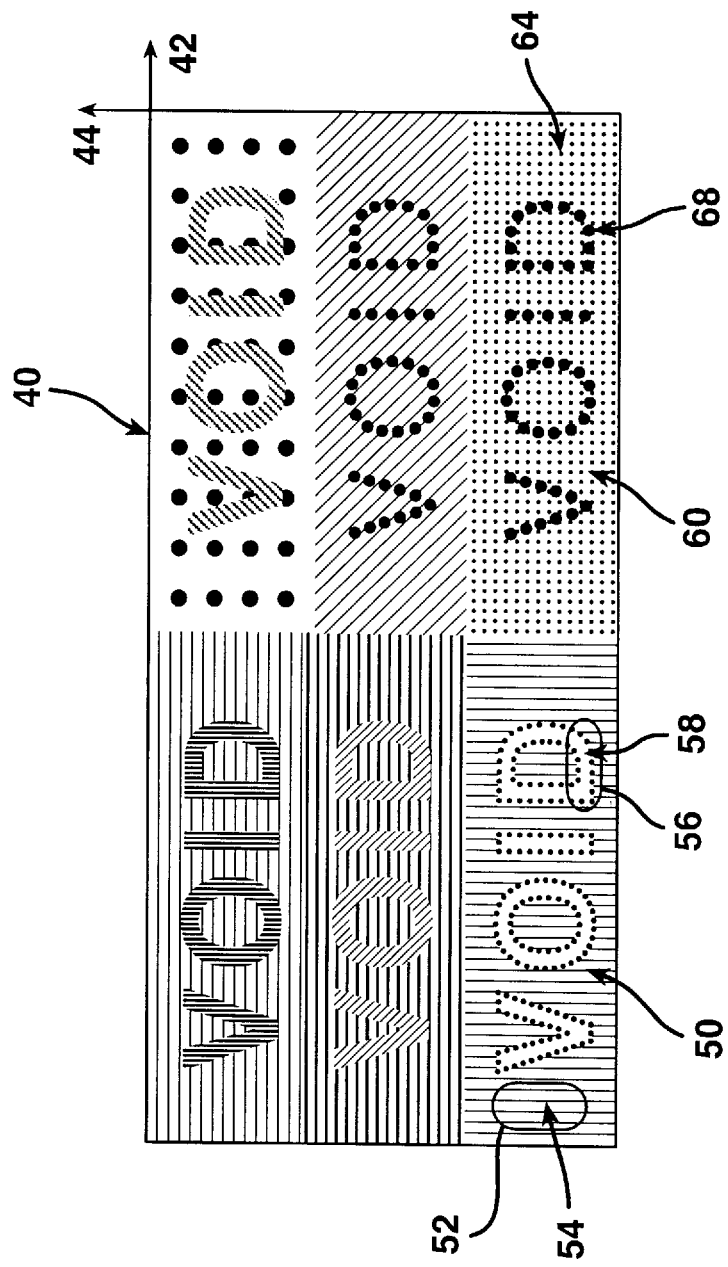
FIG. 2 is a schematic representation of a security document containing copy modules according to the present invention.

Reference is made to FIGS. 1 and 2 which illustrate a check 10 and security document 40 according to the present invention. It will be appreciated that the documents shown in FIGS. 1 and 2 are depicted diagrammatically and are not made to scale.

In FIG. 1, a check 10 having a horizontal axis 12 and a vertical axis 14 is shown. A copy module 20 is indicated in the corner. The copy module 20 contains background printed matter 22, made up of background elements 24. The copy module 20 also contains a security term 26, the word "VOID," composed of security term elements 28. In copy module 20, the background elements 24 are line segments oriented at a 0 degree angle to the horizontal axis 12 of the check 10. The security term elements 28 of copy module 20 are also line segments. However, these line segments are oriented at a 135 degree angle to the horizontal axis 12 of the check 10.

In FIG. 2, a security document 40 having a horizontal axis 42 and a vertical axis 44 is shown. A copy module 50 is indicated. The copy module 50 contains background printed matter 52, made up of background elements 54. The copy module 50 also contains a security term 56, the word "VOID," composed of security term elements 58. In copy module 50, the background elements 54 are line segments oriented at a 90 degree angle to the horizontal axis 42 of the security document 40. The security term elements 58 of copy module 50 are small dots.

Copy module 60 is adjacent to copy module 50. The background elements 64 in copy module 60 differ from the background elements 54 in copy module 50. The background elements 64 are small dots, while the background elements 54 are line segments. Also, the security term elements 68 in copy module 60 differ from the security term elements 58 in copy module 50. The security term elements 68 are large dots, while the security term elements 58 are small dots.

As shown in FIGS. 1 and 2, the background elements and/or the security term elements vary between adjacent copy modules. This variation may include changing between lines and dots, changing the size of the dots used, changing the orientation (angle) of the lines, changing the frequency of the rows of lines or dots, and changing the density of the background printed matter and the security term by altering the amount of surface area of the copy module that is covered with ink. Also, the size of the warning message can be changed between adjacent copy modules, as can the position of the warning message within each copy module. In addition, the tone of the elements may also be changed from one copy module to another.

Specifically, referring to FIG. 1, each copy module area 20, e.g., a selected area 20a, is bounded by directly adjacent areas, e.g., directly adjacent areas 20b, 20c, 20d, 20e, containing a pattern of background elements 24 and a pattern of security elements 28. The background elements 24 and the security elements 28 within a selected area 20a differ in element size, shape, angle, density, or frequency from corresponding background elements 24 and security elements 28 in a directly adjacent area 20b offset from the selected area 20a in a first direction 4. Further, the background elements 24 and the security elements 28 within the selected area 20a differ in element size, shape, angle, density, or frequency from corresponding background elements 24 and security elements 28 in a directly adjacent area 20c offset from the selected area 20a in a second direction 6, which may be orthogonal to the first direction 4. A linear projection 8 co-linear with the first direction 4 does not intersect both of the first directly adjacent area 20b and the second directly adjacent area 20c.

More specifically, referring to FIG. 1, the background elements 24 within the selected area 20a differ in element shape from corresponding background elements 24 and security elements 28 in the directly adjacent area 20b. The security elements 28 within the selected area 20a differ in element shape from corresponding background elements 24 and security elements 28 in the directly adjacent area 20b. The background elements 24 within the selected area 20a differ in element angle from corresponding background elements 24 in the directly adjacent area 20c and differ In element shape from the security elements 28 in the directly adjacent area 20c. The security elements 24 within the selected area 20a differ in element density and frequency from the background elements 24 in the directly adjacent area 20c and differ in element shape from the corresponding security elements 28 in the directly adjacent area 20c.

Specific various shapes of the background and security elements include dots (both large dots and small dots), line segments, triangles, rectangles, curves, swirls, and other geometric shapes. A "printed dot" is defined as an element that is generally circular in shape. However, a "printed dot" may have rough edges or be elliptical in shape due to the conditions of printing. Examples of various relationships between the background elements and the security elements include:

| Background elements | Security Term Elements |
| --- | --- |
| Large dot | Small dot |
| Small dot | Large dot |
| Line segment | Small dot |
| Line segment | Large dot |
| Small dot | Line segment |
| Large dot | Line segment |
| Line segment | Line segment |

The rows of small dots and large dots may be oriented in the same direction. The line segments may be oriented in the same direction as the rows of large or small dots. Alternatively, the line segments may be oriented at a different angle than the rows of dots. A preferred angle is 90 degrees. When both the background elements and the security term elements are composed of line segments, the line segments of one set of elements will be at a different angle than the line segments of the other set of elements. A preferred angle is 90 degrees.

The frequencies of the background elements and the security term elements may be the same or they may be different. If the frequencies are different, it is preferred, but not required, that one set of elements be spaced at twice the frequency of the other set of elements. For instance, one useful combination is 130 lines per inch for the security term elements and 65 lines per inch for the background elements. Another useful combination is 120 lines per inch for the security term elements and 60 lines per inch for the background elements.

The density of the background printed matter and the security term on the surface of the document may vary from 3 percent coverage to 50 percent coverage. Preferably, densities of 10 to 15 percent are used. The density of the background printed matter and the density of the security term within a copy module may be the same, or the densities may differ. Also, densities and density differentials may differ from one copy module to the next. These density differences result in copy modules which may produce positive or negative images at different copier settings.

Density differentials between the background printed matter and the security term can make the security term more noticeable on a photocopy without excessive visibility on the original. Preferably, a difference in the density is small to reduce the likelihood that the security term will be noticed. For example, one useful combination would be a density of 15% for the security term and 10% for the background printed matter. The small density difference will tend to make the security term more obvious on a photocopy. If desired, a camouflage image may be used to make security terms less apparent on the original security document.

Elements shaped as line segments will have an angular orientation with respect to the security document. Preferably, line segments are oriented at 0, 15, 30, 45, 60, 75, 90, 105, 120, 135, 150, or 165 degrees to the horizontal axis of the security document, but any angular orientation may be used.

Each copy module contains a security term. The security term may take the form of a single warning word, such as "VOID." Alternatively, the security term may be in the form of multiple warning words in each copy module. In another alternative, the security term may form part of a large warning word covering multiple copy modules. These various alternatives allow for placement of warning messages of a broad range of sizes anywhere on the surface of the security document.

The tone of the security document may be a uniform tone over the document surface. In this embodiment, the density of the document may have different values for the security term and the background printed matter, but the field will appear constant. Alternatively, the surface of the security document may use a graded or graduated screen. In this embodiment, for example, the frequencies of the background elements and the security term elements remain the same, while the size of the elements is varied across the document. As an example, the frequency might be 130 lines per inch and 65 lines per inch for the background elements and the security term elements, respectively. The size of the background elements may vary across the document so that the density varies from 30% of the area covered to 3%, and the size of the security term elements may vary across the document so that the density varies from 49% to 4% of the area covered. For example, the highest percentages of coverage may be at the top of the security document. These percentages are then gradually reduced toward the bottom of the document. This change in coverage percentages may occur in steps, producing bands of slightly differing tone. If desired, however, the size of the elements or the frequency of the elements, or both, may be continuously varied over the document surface. Regardless of the manner in which the size of the background elements and the size of the security term elements are varied, the selection of element sizes for a given area on the document is made such that they provide generally equal tone. The tones may differ more if a camouflage image is used.

The copy module areas can be any shape. In addition, more than one shape of copy module can be used in a security document. Preferably, a shape such as a rectangle, a square, a circle, or a triangle is used. Most preferably, copy modules are rectangular in shape.

The security document of the present invention contains at least two copy modules. Preferably, at least ten copy modules are present on a security document. More preferably, at least twenty copy modules are used. Most preferably, at least forty copy modules are used on the security document.

It should be understood that the phrase "security term" is intended to include not only words, such as the word "VOID" shown in the drawings, but also words and phrases which simply make evident to an observer that the document being inspected is a copy of the original document. Such phrases as "PHOTOCOPY", "COPY", and "DUPLICATE" may be used for this purpose. Also intended to be included within the phrase "security term" are words or symbols which may signify to the individual making the copy that the original document is authentic.

It should be appreciated that the phrase "cancellation term" is intended to include words, such as the word "VOID" shown in the drawings, and phrases, such as "UNAUTHORIZED COPY," which make evident to an observer that the document being inspected is a copy of the original document and that the copy is not authentic.

It should be understood that any of a wide variety of camouflage images may be utilized in this fashion to disguise the cancellation terms on a security document according to the present invention. For a camouflage to be effective, the camouflage image usually occupies about 50% of the document surface area. A properly configured camouflage image becomes the dominant image in the eye of the casual observer. A camouflage image may be defined by the absence of elements within the image area or by the presence of further printed elements. Elements which are removed to define a camouflage image may be wholly or partially removed. Partial removal of an element results in a portion of the element being completely removed.

It should be appreciated that the term "adjacent" refers to areas that are adjoining. For example, "adjacent copy modules" are copy modules that share a portion of their respective boundaries with each other. The term "ordered array" describes an organized layout of areas of approximately equal size. The phrase "readily duplicated" is defined as being capable of being clearly reproduced without significant blurring of the image.

A preferred method for producing a document according to the present invention is as follows:

1. Define the size of the area to be filled by the security term and the background.

2. Sub-divide the larger area into smaller sectors of a size to just accept the security term. Begin with several recommended message sizes and manipulate the message areas and the messages to fit and fill the overall area. These areas will often be rectangular, but need not always be so. It is preferable to use large message words and to fill the area with as many words as possible.

3. Create area boundaries for the unit background areas and fill them all with the preferred density value. A density of 10% is useful for many conditions. The boxes do not have to be the same size. They should fit together to achieve the area coverage desired. Floor tile designs give a model for such area fills.

4. Size the warning messages to just fill the unit background areas. If the background boxes are of various sizes, security terms must be sized to fit each box.

5. Assign screen type, screen angle, and percentage of area covered to the elements of each security term. Some assignments will produce messages lighter than the background and others will produce messages darker than the background on the printed page. The copier will also produce some copies with messages lighter than the background and others with messages darker than the background. Both general effects may occur to different degrees on the same document in one or more of the copy modules.

6. Assign screen type and screen angle to the elements of the background areas based on the values assigned to the security term elements. These assignments should be coordinated with the message assignments to bring out the messages as expected.

7. Link the assigned background fill and the related message into a single unit that fully describes the sector except for the selected camouflage.

8. Cover as much of the area as desired with the selected camouflage pattern.

Having described the improved security document of the present invention in detail and by reference to different embodiments thereof, it will be apparent that certain modifications and variations are possible without departing from the scope of the invention defined in the appended claims.

What is claimed is:

1. A security document comprising:
   a substrate having a top surface for carrying printed indicia;
   said top surface defining a plurality of areas; said areas being organized in an ordered array; each of said areas containing:
   a) background printed matter printed on said top surface, said background printed matter made up of a pattern of background elements; and
   b) a security term printed on said top surface of said substrate, said security term composed of a pattern of security term elements; wherein, said background elements, or said security term elements, or both, within one of said areas, differ in element shape from background elements and security term elements within another of said areas; and further, wherein, within each of said areas, either said background elements or said security term elements are not readily duplicated by a color copier while the remaining elements in said area are readily duplicated by a color copier, whereby, upon copying of said security document, a visually perceptible security term is produced.

2. The security document of claim 1 wherein said background printed matter is made up of a pattern of background elements of substantially the same size.

3. The security document of claim 1 wherein said security term is made up of a pattern of security term elements of substantially the same size.

4. The security document of claim 1 wherein said background elements in one or more of said areas are not resolvable by a color copier.

5. The security document of claim 1 wherein said security term elements in one or more of said areas are not resolvable by a color copier.

6. The security document of claim 1 wherein said security term is a cancellation term.

7. The security document of claim 1 wherein each said security term element is a printed dot or a line segment.

8. The security document of claim 1 wherein each said background element is a printed dot or a line segment.

9. The security document of claim 1 wherein each said security term element and each said background element is a printed dot.

10. The security document of claim 1 wherein each said security term element and each said background element is a line segment.

11. The security document of claim 7 wherein said line segments are oriented at angles of approximately 0, 15, 30, 45, 60, 75, 90, 105, 120, 135, 150, or 165 degrees to the horizontal axis of said security document.

12. The security document of claim 1 wherein said background elements are spaced at twice the frequency of said security term elements.

13. The security document of claim 1 wherein said top surface contains at least three said areas.

14. The security document of claim 1 wherein said top surface contains at least four said areas.

15. The security document of claim 1 wherein said top surface contains at least ten said areas.

16. The security document of claim 1 wherein said top surface contains at least twenty said areas.

17. The security document of claim 1 wherein said top surface contains at least forty said areas.

18. The security document of claim 1 wherein said security term elements in one of said areas are not resolvable by a color copier and said background elements in another of said areas are not resolvable by a color copier.

19. The security document of claim 1 wherein said background elements or said security term elements, or both, differ in element size, shape, angle, density, or frequency between adjacent areas.

20. A security document comprising a substrate having a top surface for carrying printed indicia, said top surface defining a plurality of areas, each of said areas being bounded by directly adjacent areas, and each of said areas containing a pattern of background elements printed on said top surface of said substrate and a pattern of security elements printed on said top surface of said substrate, wherein said background elements, said security elements, or both, within a selected one of said areas differ in element size, shape, angle, density, or frequency from background elements in an area offset from said selected area in a first direction across said top surface and differ in element size, share, angle, density, or frequency from security elements in said area offset from said selected area in said first direction across said top surface, said background elements, said security elements, or both, within said selected area differ in element size, shape, angle, density, or frequency from background elements in an area offset from said selected area in a second direction across said top surface and differ in element size, shape, angle, density, or frequency from security elements in said area offset from said selected area in said second direction across said top surface, said first direction is directed towards a first directly adjacent area, said second direction is directed towards a second directly adjacent area, and wherein a linear projection co-linear with said first direction does not intersect both of said first directly adjacent area and said second directly adjacent area.

21. A security document as claimed in claim 20, wherein said first direction and said second direction are substantially orthogonal.

* * * * *

UNITED STATES PATENT AND TRADEMARK OFFICE
CERTIFICATE OF CORRECTION

PATENT NO : 5,853,197

DATED : December 29, 1998

INVENTOR(S) : William H. Mowry, Jr. and A. Dale Lakes

It is certified that error appears in the above-identified patent and that said Letters Patent is hereby corrected as shown below:

Col. 10, line 20, "size, share, angle" should be --size, shape, angle--.

Signed and Sealed this

First Day of June, 1999

*Attest:*

Q. TODD DICKINSON

*Attesting Officer*     *Acting Commissioner of Patents and Trademarks*